United States Patent [19]
Szidon

[11] 3,986,895
[45] Oct. 19, 1976

[54] RESERVE ACTIVATED ELECTROCHEMICAL CELL
[75] Inventor: Daniel K. Szidon, Minnetonka, Minn.
[73] Assignee: Honeywell Inc., Minneapolis, Minn.
[22] Filed: Nov. 21, 1974
[21] Appl. No.: 525,901

[52] U.S. Cl. .............................................. 429/113
[51] Int. Cl.² ......................................... H01M 6/30
[58] Field of Search ................................... 136/90

[56] References Cited
UNITED STATES PATENTS

| | | | |
|---|---|---|---|
| 3,434,884 | 3/1969 | Amiet | 136/90 |
| 3,653,973 | 4/1972 | Broglid | 136/90 |
| 3,712,835 | 1/1973 | Kaye | 136/90 |
| 3,739,769 | 6/1973 | Kaye | 136/90 |
| 3,846,177 | 11/1974 | Mauch et al. | 136/90 |

Primary Examiner—T.H. Tubbesing
Assistant Examiner—Richard E. Berger

[57] ABSTRACT

A reserve activated electrochemical cell in which a reservoir containing a quantity of electrolyte is placed within an outer cylinder and is biased to force the reservoir to a predetermined active position. Restraining means are provided to restrain the reservoir in a second or reserve position remote from the active position. Upon removal of the restraining means the reservoir is moved to an active position and cell activation begins. Also included is an electrolytic cell to operably connect with the reservoir and valve means are provided between the cell and the reservoir to permit flow of electrolyte from the reservoir into the cell under pressure.

8 Claims, 4 Drawing Figures

RESERVE ACTIVATED ELECTROCHEMICAL CELL

BACKGROUND OF THE INVENTION

It has long been recognized that a reserve activated electrochemical cell will have a significantly longer life prior to its use than does a cell which is activated during its manufacture. Many designs have been proposed for a single unitary package containing an electrochemical cell ready for operation, minus one or more of its components, which component is separated in another portion of the package. By one means or another, the missing component is brought into contact with the cell and activation occurs upon the activation of such a means.

By far the most common method for preparing a reserve activated cell is to separate the electrolyte from the anode and cathode. Thus, the rapidly movable electrolyte solvent, with or without the electrolyte salt, is maintained in an inert environment remote from the active materials of the cell until it is needed.

Many prior art methods exist for separating the electrolyte and the remaining parts of the battery until the desired time for bringing them together. These methods include the placement of a frangible barrier between the electrolyte and the cell, the use of a completely destructable capsule for either the electrolyte or the cell, and the like. However, all of these prior art methods are either too expensive or so intricate that their reliability is not sufficiently acceptable. Accordingly, it is an object of this invention to provide a reserve activated electrochemical cell.

Another object of this invention is to provide an inexpensive and reliable reserve activated cell which is capable of long shelf life prior to activation and yet which is capable of delivering a reasonable amount of energy during its active or useful life.

Other objects will appear hereinafter.

BRIEF DESCRIPTION OF THE INVENTION

It has now been discovered that a reserve activated electrochemical cell may be produced in the following manner. Specifically, it has been discovered that the electrolyte may be maintained separate from the balance of the cell, in a reservoir contained in an outer cylinder having a central axis. Biasing means are provided to act upon the reservoir to force it to a predetermined active position along that axis. Restraining means are further provided to maintain the reservoir in a reserve position remote from the active position, which restraining means are adapted to be removed upon a desire to activate the cell. The electrolytic cell is positioned to operably connect with the reservoir upon movement of the reservoir to the active position. Valve means are provided between the cell and the reservoir to permit flow of electrolyte into the cell at the time of activation. A pressure means is provided for forcing the electrolyte from the reservoir to the cell movement of the reservoir to the active position, regardless of orientation. The cell is operable over a wide temperature range (limited only by the chemistry) and is capable of withstanding great shock.

BRIEF DESCRIPTION OF THE DRAWINGS

For a more complete understanding of the present invention, reference is hereby made to the drawings, in which.

DETAILED DESCRIPTION OF THE DRAWINGS

Reference is hereby made to the drawings in which like numbers represent like parts in all of the figures.

Figure 1:
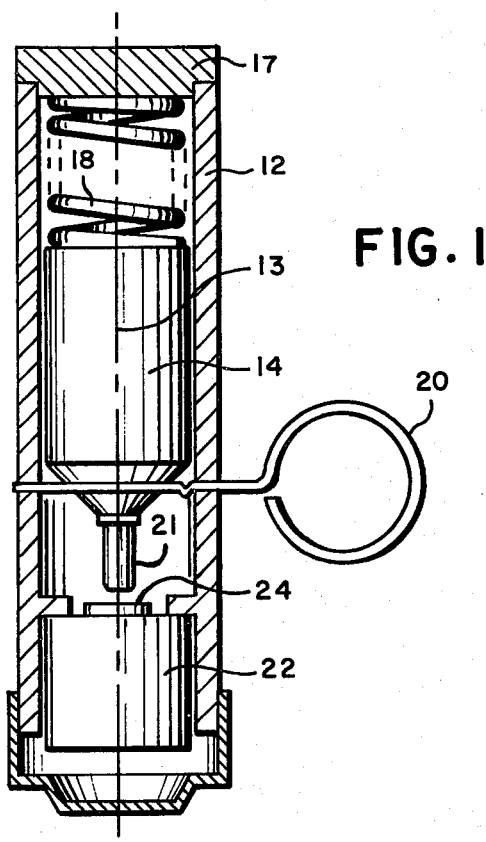
FIG. 1 is a partially sectioned view of a reserve activated electrochemical cell according to the present invention.

As shown in FIG. 1, a reserve activated electrochemical cell is shown generally by the numeral 10. This cell includes an outer cylinder 12 having a central axis 13. Positioned within the cylinder 12 is a reservoir 14 which contains a quantity of electrolyte. Restraining means 20 are provided to maintain the reservoir 14 in a reserve position and prevent movement of the reservoir 14 toward the cell 22. Biasing means 18, in the form of a spring, is provided to force against the end 17 and the reservoir 14, serving to force the reservoir 14 towards the cell 22 to an active position upon removal of the restraining means 20. A valve means shown generally as 24 is provided to permit entry of the nozzle 21 into the cell 22 upon activation.

Figure 2:
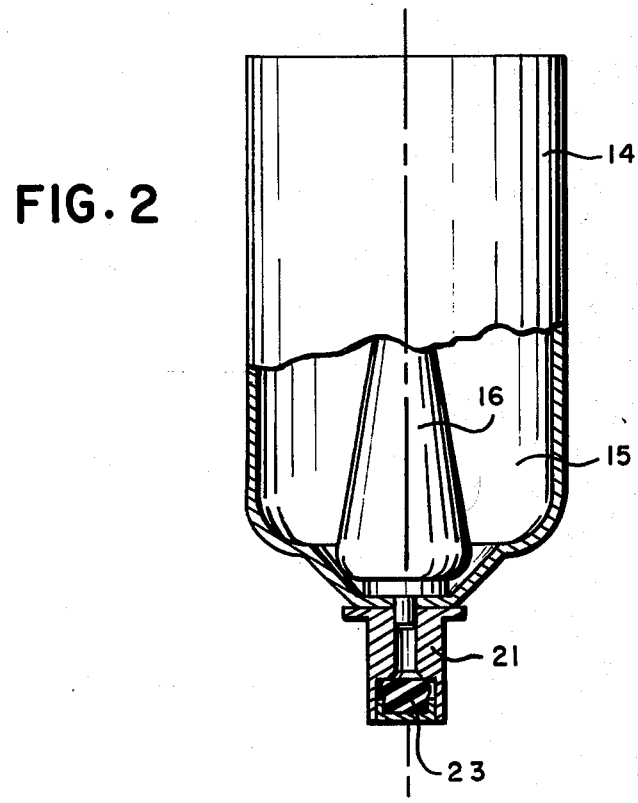
FIG. 2 is a partially sectioned view of one portion of a cell according to the present invention.

As shown in FIG. 2, the nozzle is connected to an inner chamber 16 of the reservoir 14. The inner chamber 16 and the outer wall 14 of the reservoir together define an outer chamber 15 which contains a quantity of inert gas such as argon under pressure. Rupturable means 23 including a seal 19, is provided to block the passageway through the nozzle 21 until activation. Rupture of the rupturable member 23, which may be manufactured from glass, rubber, metals such as aluminum or other easily penetrated materials, or combinations thereof, may be accomplished by movement of the reservoir 14 to the predetermined active position and placement of the nozzle 21 in the valve means.

Figure 3:
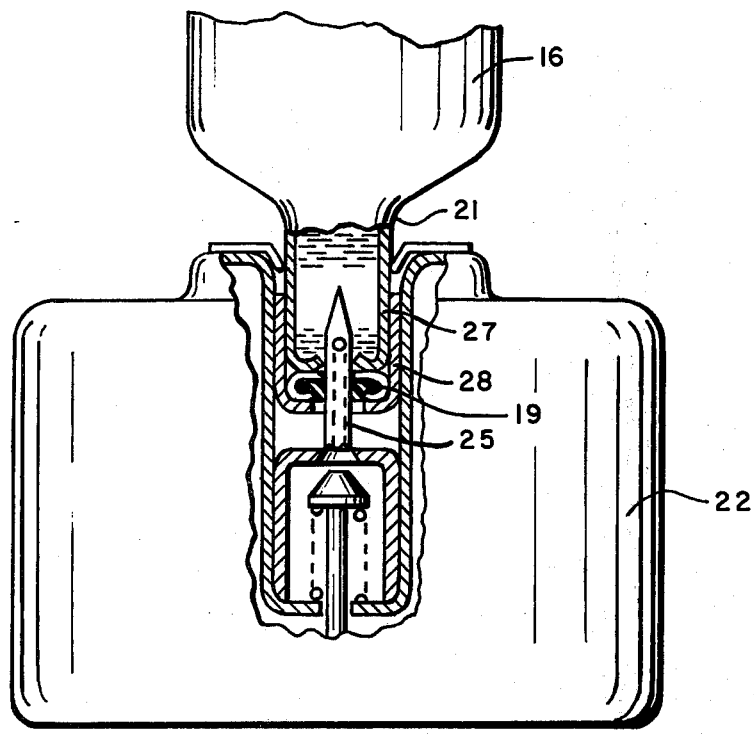
FIG. 3 is a partially sectioned view of another portion of a cell built according to the present invention.

As shown in FIG. 3, the valve means contains a needle 25 which is positioned to penetrate the rupturable member 23 and the seal 19 upon insertion of the nozzle 21 and the reservoir of electrolyte into the predetermined active position. The tube end 27 of the inner chamber 16 and the sides of the valve 28, which extend upward towards the reservoir, form a seal along with the rubber portion 19 of the rupturable means 23, which prevents entry of the pressurized gas into the cell 22 from the outer reservoir 15 and allows the electrolyte to flow through the needle 25 in the cell 22.

Figure 4:
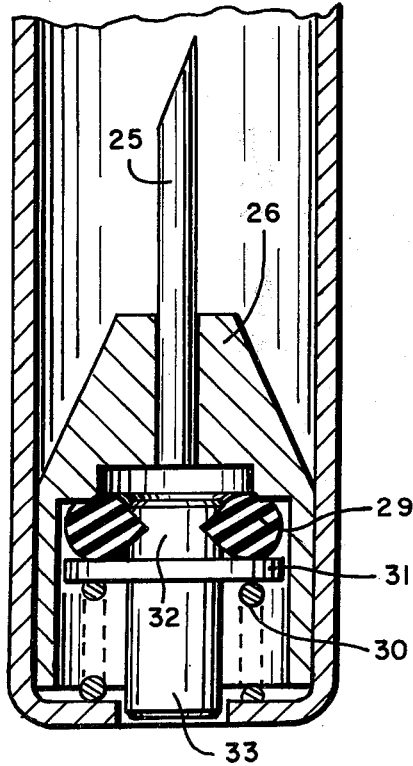
FIG. 4 is a partially sectioned view showing a preferred embodiment of the present invention.

In FIG. 4, a preferred embodiment is shown which is effective to seal the cell upon passage of electrolyte into the cell. Specifically, a hub 26 is attached to the needle 25 for support of the needle. A T-shaped member having a horizontal portion 31 and a vertical portion 32, is cooperatively mounted with an O ring 29. Spring 30 is positioned to bias the horizontal portion 31 against the O ring 29, thereby causing verticle portion 32 to prevent flow of fluid through the needle 25 and out port 33.

This spring 30 is set to give an effective pressure or resistance to flow in an amount tending to normally keep the valve closed, thereby preventing flow of fluid through the valve. Thus the cell 22 is effectively isolated from outside environments through its only opening, which is in conjunction with the port 33 of the valve shown in FIG. 4. Upon arrival of the reservoir to the predetermined position, followed by rupture of the barrier by the needle 25, the pressure contained in the outer chamber, which in one embodiment may be in the order of 80 to 100 psi, acts upon the electrolyte contained in the inner chamber to force it through the needle 25 into the cell 22. The spring 30 in the valve 24 is adjusted to give a nominal back pressure in the order of 14 to 15 psi tending to keep the valve closed. As the fluid is under a significantly greater pressure than the spring is exerting, the spring is compressed and a quantity of electrolyte flows rapidly from the inner chamber 16 to the cell 22. Upon equalization of this pressure after the required amount of electrolyte has passed into the cell, the spring 30 then exerts its nominally 15 psi of pressure against the horizontal and vertical portions of the plug 31 and 32 and the O ring 29 to effectively seal the cell from the remaining portion of the device. The electrolyte is in the cell at this point and has activated the battery, and it is effectively prevented from escaping from the cell, regardless of the position of the battery during use.

A number of cells were built according to the present invention and were evaluated for various performance characteristics. A conventional, nonaqueous electrochemical cell, 7 plate (4 anodes and 3 cathodes) 750 milliamp hour reserve battery was employed. Several of these cells were stored for periods of time ranging up to two weeks at temperatures ranging −40° F to 160° F. After storage, several of these cells were activated at equilibrium temperatures ranging from 0° F to 125° F. The cells were operated against a constant resistance of 60 ohms and the time was measured for discharge from an initial voltage of approximately 3 volts to the discharge voltage of 2 volts. All of the cells activated upon removal of the restraining means and a number of them were successfully capable of discharging for a period of approximately 17 hours under these above-described conditions, thus clearly demonstrating that a useful reserve activated electrochemical cell has been constructed.

Various modifications of the invention will become apparent to those skilled in the art upon reading the instant disclosure.

Having thus described the invention, what is claimed is:

1. A reserve activated electrochemical cell, comprising:
   an outer cylinder having a central axis;
   a reservoir within said cylinder, containing a quantity of electrolyte, said reservoir including an outer chamber defining means for containing gas under pressure and an inner chamber defining means for containing said electrolyte;
   biasing means acting to force said reservoir to a predetermined active position along said axis;
   restraining means maintaining said reservoir in a second reserve position remote from said active position, said restraining means being removable to permit movement of said reservoir to said active position;
   an electrolytic cell positioned to operably connect with said reservoir upon movement of said reservoir to said active position;
   valve means positioned between said cell and said reservoir to permit flow of said electrolyte into said cell upon movement of said reservoir to said active position, said inner chamber of said reservoir being adapted to define a passageway with said valve means upon movement of said reservoir to said active position; and
   pressure means for forcing said electrolyte from said reservoir to said cell upon movement of said reservoir to said active position.

2. The device of claim 1 wherein said inner chamber defining means is structurally unable to resist said pressure in said outer chamber defining means upon formation of said passageway, whereby said electrolyte is forced into said cell.

3. The device of claim 2 wherein said inner chamber defining means is a collapsible tube adapted to contain said electrolyte.

4. The device of claim 1 wherein said restraining means prohibits movement of said reservoir along said axis in a direction toward said active position.

5. The device of claim 1 wherein said cell is centered about said axis.

6. The device of claim 2 wherein said inner chamber includes a rupturable member blocking said passageway, said valve means including means for penetrating said rupturable member upon formation of said passageway.

7. The device of claim 6 wherein said valve means and said inner chamber defining means cooperatively include means sealing said inner chamber defining means from said outer chamber defining means.

8. The device of claim 6 wherein said valve means includes means for sealing said cell upon passage of said electrolyte into said cell.

* * * * *